United States Patent
Pepe et al.

(10) Patent No.: US 8,754,149 B2
(45) Date of Patent: Jun. 17, 2014

(54) CEMENT COMPOSITIONS WITH A HIGH PHOTOCATALYTIC POWER AND AN IMPROVED RHEOLOGY

(75) Inventors: Carmine Pepe, Bergamo (IT); Gian Luca Guerrini, Cernusco sul Naviglio (IT)

(73) Assignee: Italcementi S.p.A., Bergamo (IT)

( * ) Notice: Subject to any disclaimer, the term of this patent is extended or adjusted under 35 U.S.C. 154(b) by 0 days.

(21) Appl. No.: 12/452,895

(22) PCT Filed: Jul. 24, 2008

(86) PCT No.: PCT/EP2008/059712
§ 371 (c)(1),
(2), (4) Date: Jan. 26, 2010

(87) PCT Pub. No.: WO2009/013338
PCT Pub. Date: Jan. 29, 2009

(65) Prior Publication Data
US 2010/0130650 A1 May 27, 2010

(30) Foreign Application Priority Data
Jul. 26, 2007 (IT) .............................. MI2007A1508

(51) Int. Cl.
*C08L 1/26* (2006.01)
(52) U.S. Cl.
USPC ............................................................ 524/3

(58) Field of Classification Search
USPC ............................................................ 524/2, 3
See application file for complete search history.

(56) References Cited

U.S. PATENT DOCUMENTS

2007/0017417 A1 * 1/2007 Terruzzi ........................ 106/622

FOREIGN PATENT DOCUMENTS

| EP | 0885857 | * | 12/1998 | ............ C04B 28/04 |
| RU | 2222508 C1 | | 1/2004 | |
| RU | 2296147 | | 3/2007 | |
| WO | WO 98/05601 | * | 2/1998 | ............ C04B 22/06 |
| WO | WO2004074202 | | 9/2004 | |

OTHER PUBLICATIONS

Culminal 6000 PR Data Sheet. 2011.*
Ash, Michael; Ash, Irene (2006). Handbook of Rheology Modifiers. Synapse Information Resources, Inc.*

* cited by examiner

*Primary Examiner* — John Uselding
(74) *Attorney, Agent, or Firm* — Abelman, Frayne & Schwab

(57) ABSTRACT

New photocatalytic cement compositions are disclosed. These contain a superfluidizing agent, a cellulosic ether with a defined viscosity, an adhesive polymer, and a lattice, as well as other standard ingredients for photocatalytic cements. The compositions are free of starch and its chemically modified derivatives.

16 Claims, 1 Drawing Sheet

CEMENT COMPOSITIONS WITH A HIGH PHOTOCATALYTIC POWER AND AN IMPROVED RHEOLOGY

This application claims priority of PCT Application PCT/EP2008/059712 filed Jul. 24, 2008, which claims priority of Italian patent Application No. MI2007A001508 filed Jul. 26, 2007.

OBJECT OF THE INVENTION

The present invention relates to new photocatalytic cement compositions, especially useful as paints, renders and plasters, provided with a high photocatalytic power and an optimal rheology, evaluated both in the step of preparing and in the step of applying.

STATE OF THE ART

Photocatalytic coating compositions, which may be applied to various substrates in order to improve the preservability and the constancy of surface color and/or reduce the charge of environmental pollutants have long been known. The photocatalytic layer applied to the surfaces may oxidize and/or decompose a variety of pollutants present in the environment in gaseous or microparticulate form, for instance N-oxides, polycondensed aromatic hydrocarbons, benzene, etc.; photocatalysis converts the above said pollutants into simpler particles, which are non volatile and may easily be washed away, thus preventing their further propagation in the atmosphere, as well as restraining the contaminant action thereof on the treated surface. Some of these compositions are for instance known from EP-A-633064, U.S. Pat. No. 4,530, 954, etc. Some have been produced in the form of paint that may be applied with rollers, others have been produced in a more viscous form that may be applied with a spatula and/or a plastering trowel. The latter have a better covering function and also allow to cover up possible unevenness in the surface of the substrate thus improving the uniformity of the coated surface. The compositions in the form of paint are extremely fluid, and may therefore be applied rapidly; however, they have a poor leveling power and, when applied in a thick layer, they tend to deform and/or drip after being applied, under the action of the force of gravity; instead, the compositions which may be leveled out (also designated as "renders" and "plasters") have a good covering power although they display a higher viscosity and therefore require a greater effort for application. The two features may not be easily integrated.

It is known from WO98/05601 that this problem may be solved effectively by using cement compositions including particles of appropriate photocatalysts therein allowing to oxidize the polluting substances in the environment in the presence of light, oxygen and water.

A type of photocatalyst useful for this purpose is specifically titanium dioxide, which is mainly present in the form of anatase, which is used as such or doped with atoms other than those of Ti.

The presence of titanium dioxide and organic additives leads the application of cement compositions to become problematic, for instance the application of paint, render or plaster compositions, especially if this application is carried out by means of a roller, a paintbrush or a paint-sprayer. Furthermore, titanium dioxide may decompose organic additives (see EP0 633 064). Therefore, it is important to select and/or use the appropriate doses of organic additives which are suitable to obtain optimal features of the film coating and of the cement structure.

In EP-A-0885857 a photocatalytic cement composition is disclosed, which includes, among the main ingredients, at least one melamine resin, at least one cellulosic ether, at least one polymer or lattice serving as an adhesivity causing agent (e.g. acrylic and ethylenic polymers, styrenic and butadienic lattices) and at least one chemically modified starch (for instance an etherified starch).

Even though these compositions have a considerable effectiveness, they are not completely satisfactory as far as rheology and photocatalytic power are concerned.

SUMMARY

The Applicant has now found a combination of organic additives, which, mixed with water and other components disclosed hereinafter, provides cement compositions which are significantly more effective than the known compositions, both as far as rheology and photocatalytic power are concerned. The cement compositions thus obtained associate features which have hardly been compatible up to now: on one side a good workability (therefore a low viscosity) upon preparation from dry mixtures; on the other side, a good consistency in a wet state just after application: this avoids the occurrence of undesirable dripping phenomena before consolidation of the product. Finally, the photocatalytic power results surprisingly higher as compared to that of the known reference compositions when the same photocatalyst is used. The cement compositions thus obtained are especially suitable for application by means of a paintbrush, a sprayer or a roller, and display an optimal consistency, without the occurrence of dripping phenomena when applied on the support. The combination of organic additives the invention is based on includes:

a) a superfluidifying agent according to the EN 934-2 standard selected among a sulphonated melamine, a sulphonated naphthalene, or a polycarboxylic, polyetheric, or polyacrylic polymer.

b) at least one cellulosic ether with a viscosity in the range between 300 and 7000 mPa·s;

c') at least one adhesivity causing agent selected among an ethylenic polymer, an acrylic polymer, and a terpolymer including as comonomers at least one ester of acrylic acid with an alcohol and at least one ester of vinyl alcohol with a carboxylic acid; or as an alternative to c')

c") a lattice selected among an acrylic lattice, a styrene lattice, and a butadiene lattice.

Another feature of the above said combination of organic additives (and also of the products achieved therewith according to the invention) is that it must not contain starch and its chemically modified derivatives.

The organic additives disclosed above are mixed with titanium dioxide, one or more hydraulic binders, fillers and optionally fine aggregates and other ingredients commonly used in the sector of cements, thus obtaining dry premixes; the latter may be stored as such in order to be mixed with water upon use, or they are added with water in the desired ratio, thus directly obtaining cement compositions with improved rheology and photocatalytic power, ready to be used and storable in this form.

The dry premix includes the components a), b), c') and d); or when the component c") is used instead of c'), the components a), b) and d) are stored separately in a solid form while c") is provided as a separate liquid phase, to be added together with the water upon use.

The invention includes the use of the above said mixtures of organic additives in the preparation of dry premixes and of the above said cement compositions; the invention extends to dry premixes and cement compositions as such, and to the final cement product obtained after the consolidation and drying thereof.

DETAILED DESCRIPTION

Figure 1:
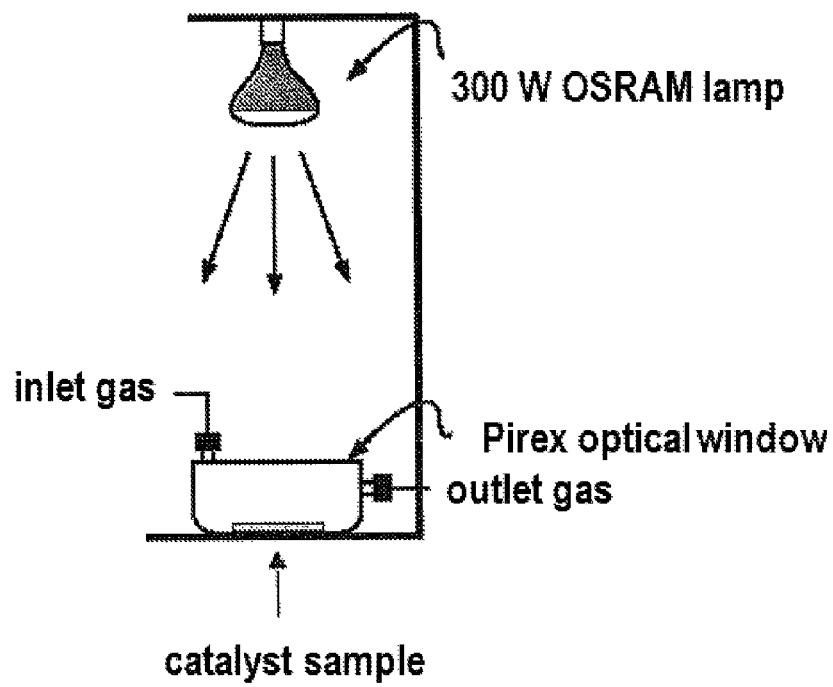
FIG. 1: graphic representation of the experimental details of the reaction chamber.

In the present disclosure, "binder" or "hydraulic binder" indicates a dry, solid state powder material which upon mixing with water, provides plastic mixtures which may dry and harden. Cements (white, gray or pigmented cements) defined according to the above mentioned UNI EN 197.1 standard as well as the so-called "cements for debris dam", the cement binding materials and the hydraulic limes, as defined in the Act N. 595 of May 26, 1965, are included in the definition of "hydraulic binder" according to the present invention.

"Dry premix" indicates a homogeneous mixture adapted to be mixed with water; such a mixing with water provides the "cement compositions" according to the invention.

"Fine aggregates" are commonly known in the field, for instance sand, and are classified in the UNI 8520 standards.

"Calcareous, silicic or silicic-calcareous fillers" are commonly available and known products. Fillers which may be used for cement compositions are defined in the UNI EN 206 standard. Such products are normally used to obtain a greater resistance, a lower porosity and a reduced efflorescence. The filler may also be selected among the mineral additions, e.g. metacaolin, $SiO_2$ and mixtures thereof.

The clinker used for preparing a binder for the present invention consists in any Portland cement clinker as defined in the UNI EN 197.1 Standard, i.e. a hydraulic material consisting of at least two thirds in weight of calcium silicates ($3CaO\ SiO_2$) and ($2CaO\ SiO_2$), the remaining part being $Al_2O_3$, $Fe_2O_3$ and other oxides.

"Environmentally polluting substances" indicate inorganic and organic substances which may be present in the environment due to exhaust gases from engines or industrial emissions. Among the inorganic substances nitrogen oxides NO and $NO_x$ may be cited, which may be oxidized to nitrates. Benzene, volatile aromatic compounds, pesticides, organic aromatic compounds, benzofluorides etc. may be cited among the organic substances.

In the present disclosure, "viscosity" indicates Brookfield viscosity, measured in a 2% solution at a temperature of 20° C.

The component a) is a superfluidifying agent: this allows the reduction of the water/cement ratio and improves the impermeability and the resistance of the cement compositions thus obtained. Superfluidifying agents are additives which are commonly known and used in the state of the art. An example of superfluidifying agent based on a sulphonated melamine resin is Melment F10 which is marketed by SKW-Trostberg; an example of sulphonated naphthalene is Superflux NF from Axim; an example of an acrylic polymer is Melflux 164 1F marketed by Basf.

The component b) consists of one or more cellulosic ethers with a viscosity in the range between 300 and 7000 mPa·s; preferably only one cellulosic ether is used with a viscosity in the range between 500 and 7000 mPa·s, on its own or in a mixture with a second ether with a viscosity between 300 and 1000 mPa·s, in a weight ratio in the range between 1/2 and 2/1; even more preferably, the cellulosic ether(s) is/are CULMINAL 6000 PR and 500 PF marketed by Aqualon, in a weight ratio equivalent to 2.8/4.2.

Examples of cellulosic ethers are hydroxypropylmethylcellulose, hydroxypropylcellulose, hydroxyethylcellulose, methylcellulose; an example of hydroxypropylmethylcellulose is that marketed by Dow Chemicals with the name Methocell 228.

The component c') or c") is a fluidifying/adhesivity causing agent: this improves adhesion, elasticity, stability and impermeability of the cement compositions containing it and also helps the formation of flexible films.

The component c') is generally a polymer powder which may be redispersed in water; for instance, a terpolymer including as comonomers at least one ester of acrylic acid with a $C_1$-$C_6$ alcohol and at least one ester of vinyl alcohol with a $C_1$-$C_{12}$ carboxylic acid, such as acetic acid (vinyl acetate) and versatic acid (vinyl versatate).

Different trialkylacetic acids having e.g. from 4 to 12 carbon atoms are commonly known by the name of "versatic acid"; for instance, trimethylacetic acid, 2,2-dimethylpropanoic acid (pivalic acid or neopentanoic acid), neodecanoic acid, which have 10 carbon atoms, all of these acids being used on their own or mixed together and also as mixtures of isomers (cf. Encyclopedia of Chemical Technology, KIRK-OTHMER, John Wiley & Sons, 3° ed., 1981, vol. 4, p. 863-864).

The additive c') is for instance the terpolymer butyl acrylate-vinyl acetate-vinyl versatate, marketed by Aqualon by the name of Elotex AP 200.

As an alternative, component c') may be replaced with one of the lattices previously listed as component c") which is not pre-mixed with the other organic additives or with the other components of the dry premix, but instead added to the cement composition upon mixing of the components thereof with water.

The acrylic polymers which may be used as adhesive agents c') are chemically different from the polymers used as superfluidifying agents a); such differences, which are commonly known to a person skilled in the art, consist in that the adhesive agents are acrylic esters having adhesive properties while the acrylic based superfluidifying agents display carboxylic and/or ether functions.

A feature of the present invention is the absence of starch and of any chemically modified starch. "Chemically modified starch" indicates any substance having the polymer structure of starch and is chemically modified by means of substituents other than the original ones, where such a modification may occur by addition or by substitution, with respect to the original substituents. The modified starches are commonly known and used in the cement field; among them etherified starches having alkylated hydroxyl groups with $C_1$-$C_6$ alkyl or hydroxyalkyl residues, for instance starch 2-hydroxypropyl ether, for instance that marketed by Aqualon by the name Amilotex 2100 or 8100, may be mentioned.

The above said organic additives are preferably used in the following weight percentages computed with respect to 100 parts by weight of inorganic components of the dry premix:
a) from 0.35 weight % to 1 weight %;
b) from 0.1 weight % to 0.8 weight %;
c') or c") from 1 weight % to 5 weight %.

Depending on the kind of cement composition that is to be prepared and depending on the desired features, one or more of the following additives for cement compositions may be used in combination with the organic additives a), b), c') or c"), among which:

d) anionic surfactants;
e) polysaccharides;
f) anti-foam agents;
g) organic or inorganic fibers.

The surfactant d) and the anti-foam agent f) specifically serve to improve the sprayability of the cement compositions. The polysaccharide e) improves the workability of the cement compositions using a mastic spatula.

The component d) is an air-entraining agent: this improves the workability and the resistance of the cement compositions to freezing/thawing. Sulphuric esters of higher alcohols may be cited among the components useful for this purpose, for instance $C_{12}$-$C_{16}$ sulphuric esters of higher alcohols, such as lauryl sulphate (for instance the product marketed by Aqualon by the name of Silipon RN 6031).

The component e) is an anti-foam agent: it controls the amount of air bubbles included in the cement compositions which contain it. The component employed may be the product marketed with the name of NOPCO PD1 of the Italian NOPCO, for example.

The component g) is for instance selected among organic fibers such as polyvinyl alcohol fibers and polyethylene fibers, or among inorganic fibers, such as carbon fibers or wollastonite fibers.

The components d)-g) are useful, although not essential for the purposes of the present invention.

The above said essential components a)-c/'c"), and possible components d)-e), with the addition of titanium dioxide, a hydraulic binder and a filler, form the dry premixes which, with the addition of water, provide cement compositions ready for application in situ, displaying the above said improved photocatalytic and rheologic features.

The hydraulic binder is typically a cement, preferably a white cement. For example, the 1-type white cement (such as I-52, 5R type white cement) or a II-type white cement (such as II-B-L type cement) can be used.

The inorganic filling material, also referred to as filler, lends the cement compositions containing it an increased resistance, a lower porosity and a reduced efflorescence. The inorganic filler is selected for instance among calcareous fillers, metacaolin ($Al_2O_3.SiO_2$) and $SiO_2$ and mixtures thereof.

Titanium dioxide is mainly used in the form of anatase; this term indicates that the titanium dioxide particles have the anatase structure by at least 5% (w/w), preferably by 25% (w/w), more preferably by at least 50% (w/w), even more preferably by at least 70% (w/w) with respect to the total titanium dioxide weight. Titanium dioxide doped with different atoms such as for instance Fe(III), Mo(V), Ru(III), Os(III), Re(V), V(IV) and Rh(III) is also included in the present definition.

Specifically, these atoms may substitute at an atomic level the Ti(IV) present in the $TiO_2$ matrix by at least 0.5%. The method of obtaining these photocatalysts is disclosed in the literature for instance in J. Phys. Chem. 1994, 98, 1127-34, Angew. Chemie 1994, 1148-9 and in Angew. Chemie Int., Ed. 1994, 33, 1091.

The invention preferably uses a mixture of anatase $TiO_2$ and rutile $TiO_2$ in a weight ratio of 70:30, and substantially 100% anatase $TiO_2$. $TiO_2$ PC 105 marketed by Millennium Chemicals, or $TiO_2$ AH-R Micro produced by Tioxide, which is substantially 100% anatase $TiO_2$, is used in an especially preferred embodiment of the invention.

The amount of titanium dioxide as compared to the cement may vary from 0.1% to 10% in weight. In a preferred aspect of the invention it is in the range between 2% and 5%; in an especially preferred aspect it is in the range between 3% and 4% in weight as compared to the cement.

The photocatalytic action must not necessarily be fast, as the contamination of the product by environmental pollutants occurs slowly in the course of time. For this reason even extremely small percentages of photocatalysts may produce an excellent preservation of the color in the course of time.

In the present invention the titanium dioxide is distributed in the whole mass of the premix, of the cement compositions and of the resulting finished items; it is therefore uniformly distributed even in the inner and deeper layers and not only on the outer surface.

The cement compositions object of the invention are obtained by addition of water to the components of the above said premixes. Generally, a water/binder ratio in the range between 0.3 and 1.5 is used where the binder is intended to be the hydraulic binder in the composition.

The compositions thus obtained may be defined and used in different manners to protect a surface with a layer of photocatalytic material. Specifically they may be used as paints, renders or plasters, in relation to the water content and to the granulometry of the existing components: in the case of paints, the water/binder ratio is generally in the range between 0.6 and 1.5 with a granulometry of the dry mixture <0.3 mm; in the case of renders, the water/binder ratio is generally in the range between 0.4 and 1 with a granulometry of the dry mixture <0.6 mm; in the case of plasters, the water/binder ratio is generally in the range between 0.3 and 0.8 with a granulometry of the dry mixture of about 1 mm.

The method of preparing the cement compositions may be any of the conventional methods. The temperature at which the water is mixed is generally in the range between +5° C. and +30° C. and is preferably at least +20° C.

The invention described up to now will now be disclosed in some examples, which should in no way limit the object of the invention.

Experimental Part

The rheologic behavior of mixtures according to the invention (and of reference mixtures) subjected to mechanical stress has been evaluated according to two parameters representative respectively of:
(i) the time of application of the mixture to the substrate by means of leveling, and
(ii) the time following the application, in which the mixture is left wet on a vertical surface.

The representative parameter of time (i) is "high rate gradient viscosity", where the gradient is generally in the range between $10^2$ s$^{-1}$ and $10^4$ s$^{-1}$. This gradient is on average that occurring when mortars are applied in a layer in the range between 0.05 mm and 5 mm at a typical application rate of 0.5 m/s.

The representative parameter of time (ii) is the "low shear stress viscosity", where the shear stress is in the range between $5\times10^{-1}$ Pa and 5 Pa. This stress is on average the stress the mortar is subjected to when wet, after being applied on a vertical surface.

The apparatus used for the experiments is a controlled-stress rotational rheometer (AR1000-N) from TA Instruments (using a blade geometry of the "vane" type) and the procedure used for the experiments was as follows:
1. Preparing the mortar (mixing powders and adding water); total mixing time 2 minutes.
2. Loading the sample and stressing the sample at a speed of 100 s$^{-1}$ for 10 minutes.
3. Applying the speed gradient from $10^2$ s$^{-1}$ to $10^4$ s$^{-1}$.
4. Stressing the sample at a speed of 100 s$^{-1}$ for 10 minutes.
5. 4 minute pause (sample not stressed).

6. Applying a shear stress equivalent to $5\times10^{-1}$ Pa and 5 Pa.

Compositions have therefore been defined according to rheology as follows:
- optimal (***): compositions with (i) <10 Pa s, (ii) >1000 Pa s
- average (**): compositions with (i) 10-100 Pa s, (ii) 10-1000 Pa s
- poor (*): compositions with (i) >100 Pa s, (ii) <10 Pa s All of the compositions with values of (i)/(ii) in the ranges (*)/(), or ()/(*) have also been classified as "average" (**);

all of the compositions with values of (i)/(ii) in the ranges (*)/(*), or (*)/(*) have also been classified as "poor" (*);

The values defined above for optimal mixtures (***) correspond to a very low viscosity (such as to require a limited effort by the user in the step of applying) and at the same time to a good adhesion to the surface (such as to avoid dripping phenomena after application).

The photocatalytic activity is evaluated on the basis of the following test designed for cutting down $NO_x$.

Instrumentation

The analysis of $NO_x$ and of the $NO_2$ salts is carried out with a Monitor Labs Model 8440E instrument that works by detecting chemiluminescence. The instrument is provided with four sensitivity ranges:
from 0.2 to 5 ppm (parts per million); from 0.1 to 10 ppm; from 0.05 to 5 ppm; from 0.2 to 10 ppm;
depending on the selected ranges of sensitivity, the precision of the instrument is 4 ppb (parts per billion) over 100 ppb or 2.5 ppb over 400 ppb.

Experimental Set Up

Description of the Figures

FIG. 1: graphic representation of the experimental details of the reaction chamber (1.5 l or 3.5 l) containing the photocatalyst sample, or catalyst sample, said chamber having a Pyrex optical window.

Figure 2:
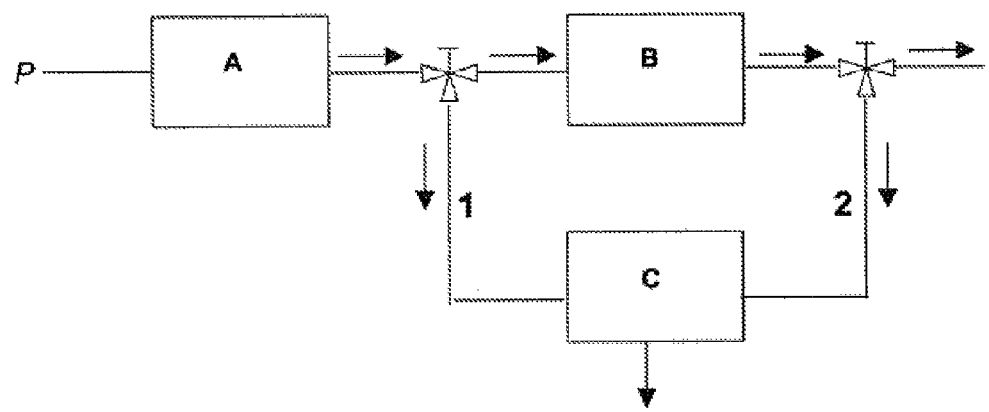
FIG. 2: graphic representation of diagram 1, in which the method of measuring the degree by which the $NO_x$ and $NO_2$ are cut down by photocatalytic action is shown.

FIG. 2: graphic representation of diagram 1, in which the method of measuring the degree by which the $NO_x$ and $NO_2$ are cut down by photocatalytic action is shown, where:

A—is a mixing chamber where a mixture of $NO/NO_2$ or $NO_2$ salts is diluted in air to obtain the predetermined amount of pollutants. The employed experimental procedure includes the use of small (2-5 L) cylinders of pure NO and $NO_2$ which are used to fill a vacuum line of the pure gas. The required amounts of gas to be diluted in air through the inlet P of the chamber are withdrawn therefrom by means of sampling vials.

B—Is the reaction chamber (1.5 l or 3.5 l) containing the photocatalyst sample, the experimental details of which are shown in FIG. 1.

C—In diagram I is the chemiluminescence detector of NOx disclosed above.

The set-up shown in diagram I may operate both under continuous flow conditions and with gas recirculation. The first case is shown in diagram I: if the flow of gas follows route 1, the amount of $NO_x$ entering the reactor may be measured; instead the amount of $NO_x$ exiting after the gas has come into contact with the catalyst both in the dark and under irradiation may be measured through route 2.

The sample to be analyzed must have a geometric surface of $65\pm2$ cm$^2$ and is positioned at a distance of $1\pm0.5$ cm below the inlet of the gas in the reactor b; for this purpose the sample is supported on a light inert support made of glass or ceramics. The sample must have a maximum thickness of $2\pm1$ cm.

The sample surfaces which are not subjected to irradiation are insulated from the contact with air by means of commercial silicone or other inert material, at least 12 hours before the test is started.

The degree of $NO_x$ lowering by using the configuration of route 1 disclosed in the experimental set up has been evaluated as follows:

$$\text{degree of } NO_x \text{ lowering } (\%) = \frac{(\text{inlet } NO_x \text{ concentration} - \text{outlet } NO_x \text{ concentration})}{\text{inlet } NO_x \text{ concentration}} \times 100$$

Four cement compositions have been prepared according to the present invention (Examples 1-4) and a reference cement composition has been prepared according to EP-A-0885857.

The conditions for the preparation of the compositions were equivalent for all of the 5 samples tested.

TABLE 1

|  | Products | Ref. (g) | Ex 1 (g) | Ex2 (g) | Ex3 (g) | Ex4 (g) |
| --- | --- | --- | --- | --- | --- | --- |
| Cement | SIB Rezzato | 400 | 400 | 400 | 400 | 400 |
| Photocatalyst | TiO2 PC 105 | 12 | 12 | 12 | 12 | 12 |
| Filler | Omnyacarb 50 AV | 600 | 600 | 600 | 600 | 600 |
| Superfuidifying | Melment F10 | 6 | 0 | 0 | 0 | 6 |
| agent | Melflux 164 1F | 0 | 3 | 3 | 3 | 0 |
| Cell. ether | Culminal 6000 PR | 0 | 1.4 | 1.4 | 2.8 | 2.8 |
|  | Culminal 500 PF | 0 | 0 | 0 | 4.2 | 4.2 |
|  | Methocel 4000 | 1.4 | 0 | 0 | 0 | 0 |
| Adhesive | Elotex AP 200 | 20 | 20 | 20 | 20 | 20 |
| Starch | Amilotex 2100 | 0.12 | 0 | 0 | 0 | 0 |
| Antifoam | Moussex | 0 | 0 | 3 | 3 | 3 |
| PHOTOCAT. |  |  |  |  |  |  |
| NO (%) |  | 72 | 84 | 88 | 83 | 82 |
| Nox (%) |  | 70 | 83 | 85 | 80 | 80 |
| RHEOLOGY |  | * | ** | ** | *** | *** |

From the data in Table 1 it may be deduced that with respect to the reference product that has been evaluated as poor (*), the compositions according to the invention, which do not contain starch but instead contain cellulosic ethers with a viscosity between 300 and 7000 mPa·s have shown a rheology from average () to optimal (*) as far as preapplication workability and postapplication consistency are concerned. The photocatalytic activity was also improved in all of the new compositions: this is especially significant if considering that all of the new and reference compositions tested contained the same amount of photocatalyst containing an identical percentage of anatase $TiO_2$.

The above said compositions of the invention may be obtained by simply mixing the respective components in any order. The photocatalyst may be added to the different components of the mixture or it may already be present in the used binder (photocatalytic cement). The various solid components are preferably mixed with one another in a dry state in an appropriate mixer (e.g. a planetary mixer) for a time (for instance 3 minutes) required to obtain a good homogenization. The order, by which the different solids components are added, makes no difference. Water is then added in the required proportions and the mixing is continued for the time (e.g. 2 minutes) required to obtain a fluid and homogeneous mortar, useful as a photocatalytic coating.

The compositions according to the invention may be applied in layers having a variable thickness, depending on the need; the thickness is generally in the range between 0.2 and 20 mm. The application is generally carried out by means of a spatula or equivalent means (e.g. plastering trowel). To increase the specific air contact surface, the surface of the applied layer may be roughened by appropriate surface treatments on the composition when still wet or already consolidated.

Items coated on the surface with the above said photocatalytic compositions are a further object of the invention. Examples of such items are paving elements such as e.g. tiles, blocks of stone, slabs and road and pavement surfaces in general. Other examples are wall structures, fronts of buildings, monuments, plates and memorial tablets, stairways, fountains, benches and other architectural and/or street furniture elements.

The invention claimed is:

1. A photocatalytic cement composition satisfactory for use as a fluid paint, without dripping, or a render, or a plaster at the same time, the plaster having a viscosity greater than that of the fluid paint, for forming a protective coating onto a surface against environmentally polluting substances including nitrogen oxides NO and $NO_x$, comprising the following organic and inorganic ingredients:
   a) a superfluidifying agent which is a sulphonated naphthalene, or an acrylic polymer;
   b) at least one cellulosic ether with a viscosity in the range between 300 and 7000 mPa·s, measured as Brookfield viscosity, 2% solution at a temperature of 20° C.;
   c') at least one adhesive polymer, which is different from the polymer used as a superfluidifying agent a) selected from the group consisting of an ethylenic polymer, an acrylic polymer, and a terpolymer including as comonomers at least one ester of acrylic acid with an alcohol and at least one ester of vinyl alcohol with a carboxylic acid; or as an alternative to c')
   c") latex selected from the group consisting of an acrylic latex, a styrene latex, and a butadiene latex,
   together with water, a photocatalyst, a hydraulic binder and a filler, and containing no starch or chemically modified derivatives thereof,
   the degree of NO and $NO_x$ lowering provided by said protective coating being between 80% and 85%,
   and wherein the composition excludes a melamine resin.

2. The composition according to claim 1, wherein component b) consists of one cellulosic ether, with a viscosity in the range between 500 and 7000 mPa·s.

3. The composition according to claim 1, wherein component b) consists of a first cellulosic ether with a viscosity in the range between 500 and 7000 mPa·s, and a second cellulosic ether with a viscosity in the range between 300 and 1000 mPa·s.

4. The composition according to claim 3, wherein said first and second cellulosic ethers are in a weight ratio in the range from 1/2 to 2/1.

5. The composition according to claim 3, wherein said first and second cellulosic ethers are methylhydroxyl-ethyl cellulose and hydroxyl-propyl methyl cellulose.

6. The composition according to claim 5, wherein said first and second cellulosic ethers are in a weight ratio in a range from of 2.8 to 4.2.

7. The composition according to claim 1, including the components a), b), c')/c") in the following weight percentages, with respect to 100 parts by weight of said inorganic components:
   a) from 0.35% to 1%;
   b) from 0.1% to 0.8%;
   c') or c") from 1% to 5%.

8. The composition according to claim 1, wherein the amount of photocatalyst is in the range between 0.3% (w/w) and 3% (w/w).

9. The composition according to claim 1, wherein the amount of photocatalyst is 1.5% (w/w).

10. The composition according to claim 1, having a water/binder ratio in the range between 0.3 and 1.5.

11. The composition according to claim 1, having a water/binder ratio in the range between 0.6 and 1.5 and a granulometry of the components of said composition without water that is lower than <0.3 mm, and is useful as a paint.

12. The composition according to claim 1, having a water/binder ratio in the range between 0.4 and 1 and a granulometry of the dry mixture of the components of said composition without water that is lower than <0.6 mm, and is useful as a render.

13. The composition according to claim 1, having a water/binder ratio in the range between 0.3 and 0.8 and a granulometry of the dry mixture of the components of said composition without water of about 1 mm, useful as a plaster.

14. A dry premix having the composition according to claim 1 not containing water.

15. A photocatalytic coating, characterized in that it consists of a fluid mortar formed by a mixture in water of the premix according to claim 14.

16. A consolidated cement item displaying the composition according to claim 14.

* * * * *